(12) United States Patent
Vovan (10) Patent No.: US 7,926,679 B2
(45) Date of Patent: Apr. 19, 2011

(54) FLUID RETENTION PACKAGE SYSTEM

(75) Inventor: Terry Vovan, Upland, CA (US)

(73) Assignee: PWP Industries (California Corporation), Vernon, CA (US)

( * ) Notice: Subject to any disclaimer, the term of this patent is extended or adjusted under 35 U.S.C. 154(b) by 431 days.

(21) Appl. No.: 12/012,632

(22) Filed: Feb. 5, 2008

(65) Prior Publication Data

US 2009/0194544 A1 Aug. 6, 2009

(51) Int. Cl.
*B65D 1/24* (2006.01)
*B65D 25/04* (2006.01)
*B65D 85/00* (2006.01)

(52) U.S. Cl. .................. 220/501; 220/575; 220/529

(58) Field of Classification Search .................. 220/501, 220/529, 556, 571, 571.1, 575, 592.01
See application file for complete search history.

(56) References Cited

U.S. PATENT DOCUMENTS

| | | | | |
|---|---|---|---|---|
| 4,865,219 A | * | 9/1989 | Logan et al. | 220/573.3 |
| 5,139,166 A | * | 8/1992 | Smith | 220/574 |
| 2004/0200844 A1 | * | 10/2004 | Watzke et al. | 220/501 |
| 2004/0200845 A1 | * | 10/2004 | Watzke et al. | 220/501 |

* cited by examiner

*Primary Examiner* — Anthony Stashick
*Assistant Examiner* — Harry A Grosso
(74) *Attorney, Agent, or Firm* — Baker Botts, LLP (57) ABSTRACT

A food bowl assembly includes a bowl (12) and a food platform (14) that lies in a lower portion of the bowl. The platform supports solid food and allows grease and other fluids to flow to a lower compartment (34) that lies under the platform. The platform has support surfaces (40) on which food lies, has recesses (42) that lie slightly below the level of the support surfaces and into which fluid drains, and has drain holes (50) in the recess though which fluids flow to the lower compartment. All of the holes lie closer to the vertical axis (16) of the bowl assembly than to the rim (24) of the platform, which avoids fluids spilling out of the holes when the bowl assembly is tipped. The bottom of the bowl or the platform, forms a deflector (64) around a region below the holes, with gaps in the barrier that allow fluid to flow to the periphery of the lower compartment.

16 Claims, 10 Drawing Sheets

FLUID RETENTION PACKAGE SYSTEM

BACKGROUND OF THE INVENTION

One type of food container holds food that is being processed, as when the food has just come out of an oven or is being heated (as by microwaves or infrared lamp) or otherwise has fluids that drip from the food, and where it is undesirable to eat the dripping fluid. One example is where the food consists of chicken or beef that is dripping grease. In that case, the food container should separate the dripped grease from the rest of the food and resist later mixing them. In some stores, the still-hot food is tilted for display, and the container should assure that the already-dripped off grease does not soak the food. One prior art approach is to place grease-absorbent material at the bottom of the container, and to mount a layer of strainer material (e.g. a fine screen) on top of the absorbent material. This approach adds a considerable cost to the container. The container is usually a throw-away container that is sold for a very low cost.

SUMMARY OF THE INVENTION

In accordance with one embodiment of the present invention, a food bowl assembly is provided that allows fluids to drain from food, that traps the drained fluids to prevent them from soaking the food or flowing out of the bowl even when the bowl is tipped for display, and that can be constructed at low cost. The bowl assembly includes a bowl and a food platform lying in the bowl at a distance above the bottom of the bowl. The bowl and platform are each formed of a separate deformed sheet of plastic. The platform separates the interior of the bowl into a large upper compartment that holds food to be consumed and a small lower compartment that holds grease and/or other fluids.

The bowl side walls form an upwardly-facing shoulder, and the platform has a rim that rests on the shoulder, so the platform can be easily installed by pushing it down into the bowl. The platform also has a radially outward projection that fits into a groove in the bowl interior side walls to prevent the spilling of fluids when the bowl is tipped and to hold down the platform. The platform has support surfaces that support the food, and has recesses lying at a level below the support surfaces for receiving dripping fluids. The recesses have a plurality of holes though which fluids can drip down to the bottom of the bowl into the lower compartment. The holes preferably lie near the center of the platform to drip fluid into the center of the lower compartment.

The bowl or platform has walls that form a deflector that extends in a circle around the center of the lower chamber into which the platform holes can drip fluid. The deflector has gaps that allow fluid to flow to the larger volume of an outer lower chamber portion that lies around the deflector, but the deflector prevents the rapid inflow of fluid.

The novel features of the invention are set forth with particularity in the appended claims. The invention will be best understood from the following description when read in conjunction with the accompanying drawings.

DESCRIPTION OF THE PREFERRED EMBODIMENTS

Figures 1, 2:
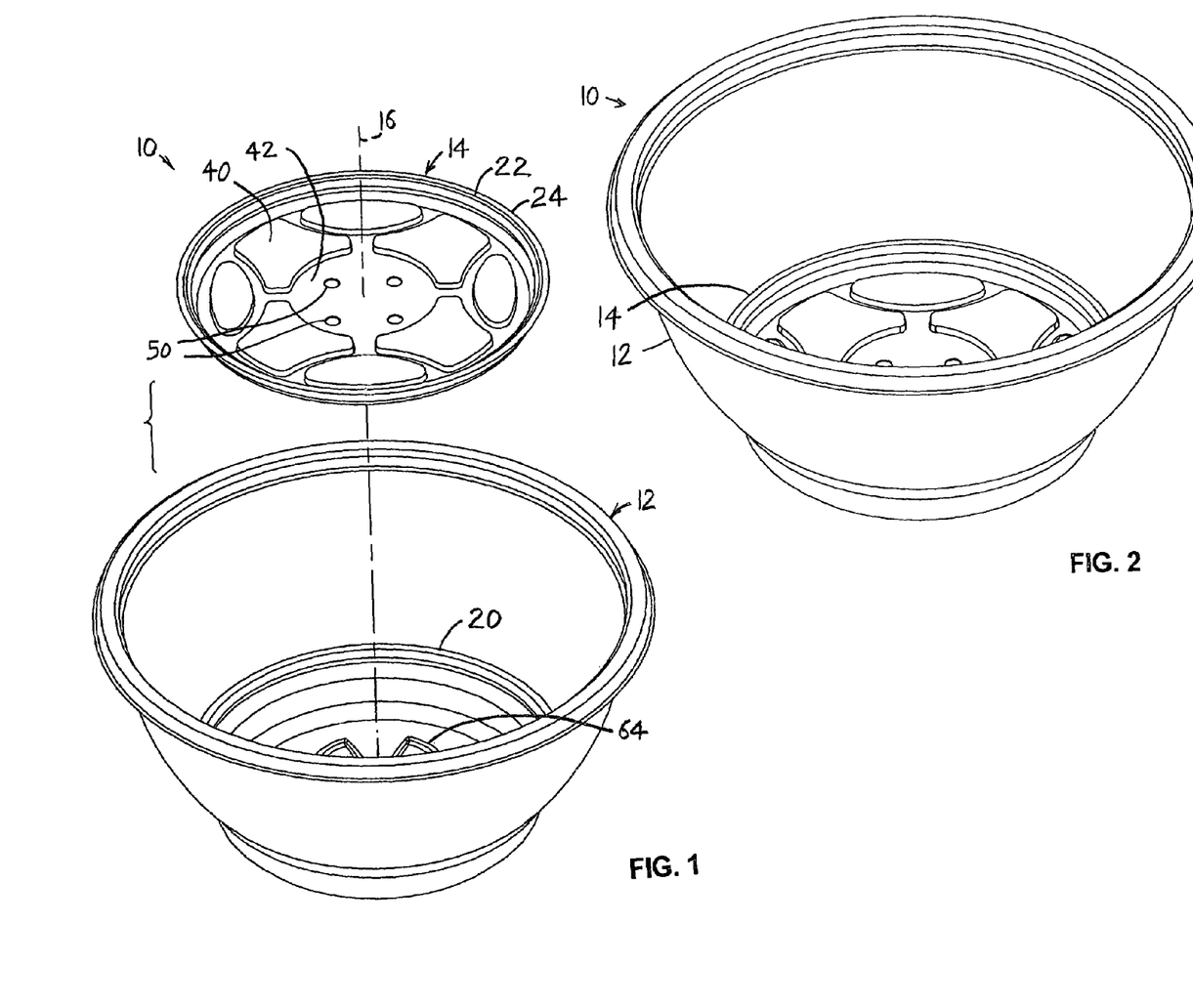
FIG. 1 is an exploded top isometric view of a bowl assembly of the invention.
FIG. 2 is a top isometric view of the bowl assembly of FIG. 1 in a fully assembled configuration.
Figure 5:
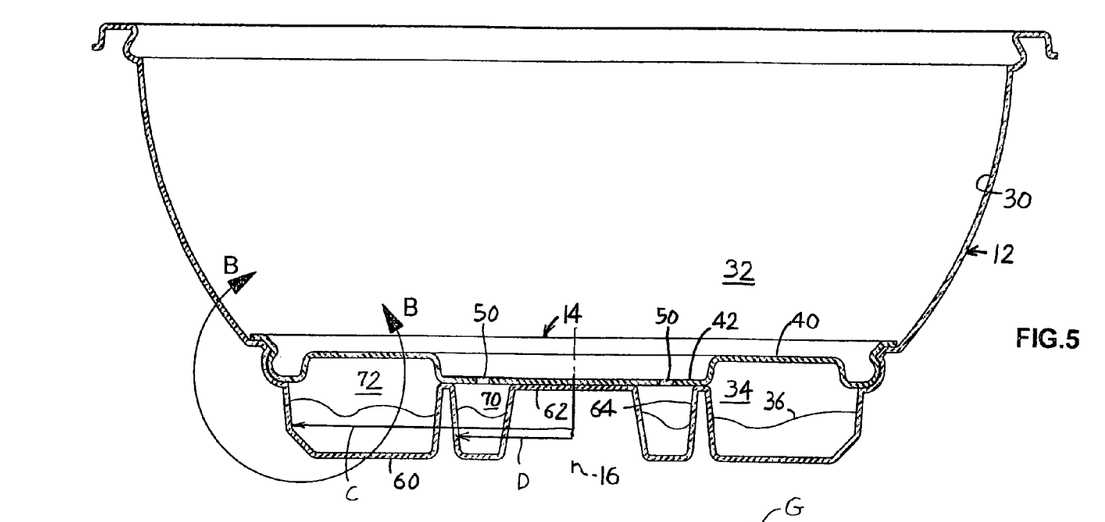
FIG. 5 is a sectional view taken on line A-A of FIG. 3.

FIG. 1 illustrates a bowl assembly 10 that includes a bowl 12 and a food platform 14 each centered on a vertical axis 16, and each preferably formed of a separate deformed sheet of plastic. An easily removeable lidding film (not shown) extends across the top of the bowl. The bowl has a largely upwardly-facing internal shoulder 20, and the platform has a peripheral portion 22 with a rim 24 that lies adjacent to (within 0.5 mm) or directly on the bowl shoulder. FIG. 5 shows that the platform 14 divides the interior 30 of the bowl into upper and lower chambers 32, 34. The upper chamber 32 holds food to be eaten, while the lower chamber 34 holds grease 36 and other fluids that are not to be eaten by the consumer of food that lies in the upper chamber. The platform has support surface portions 40 that support food that lies in the upper chamber, and has channels or recesses 42 that are intended to receive fluids that drain from the food. The platform has drain holes 50 in the recesses, that allow fluids to fall into the lower compartment.

Figure 6:
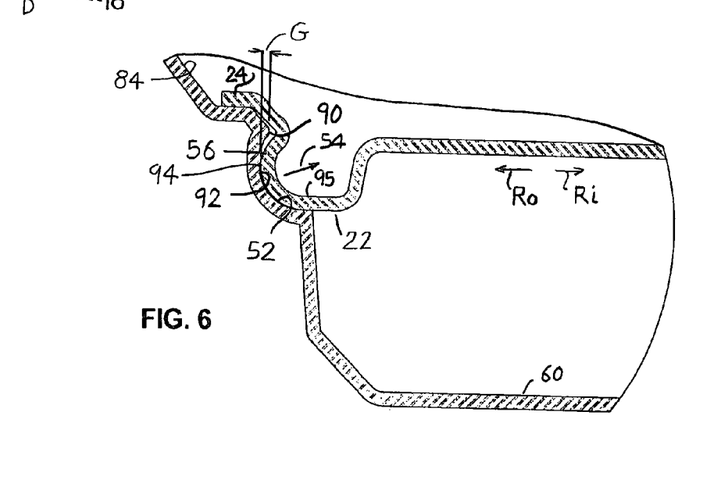
FIG. 6 is an enlarged sectional view of area B-B of FIG. 5.
Figure 7:
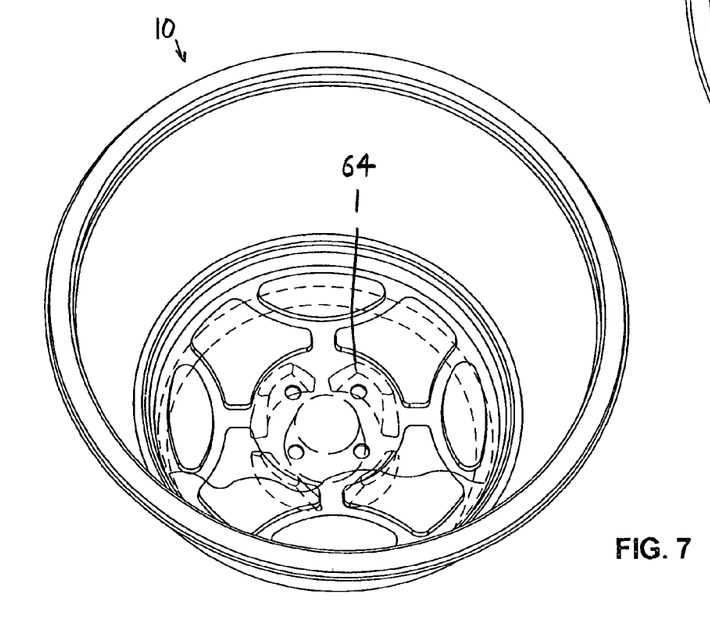
FIG. 7 is a top isometric view of the assembled bowl assembly of FIG. 2.
Figure 8:
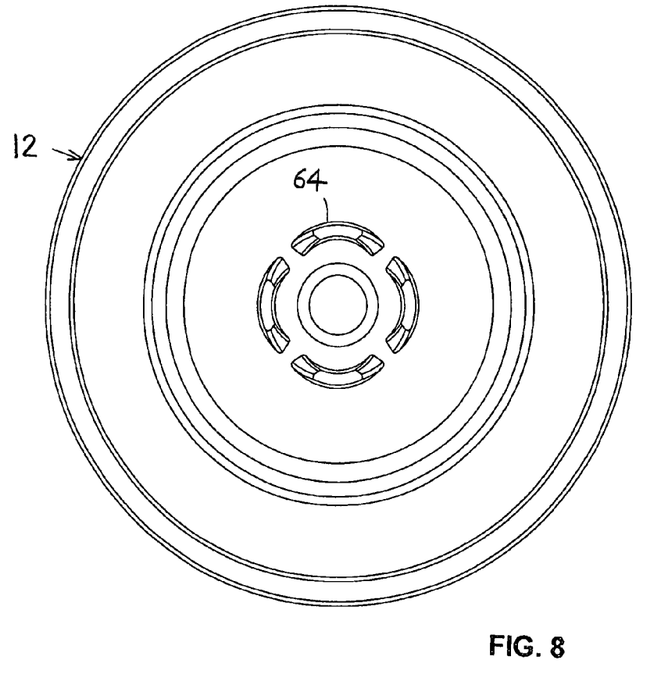
FIG. 8 is a plan view of only the bowl of FIG. 4.
Figure 9:
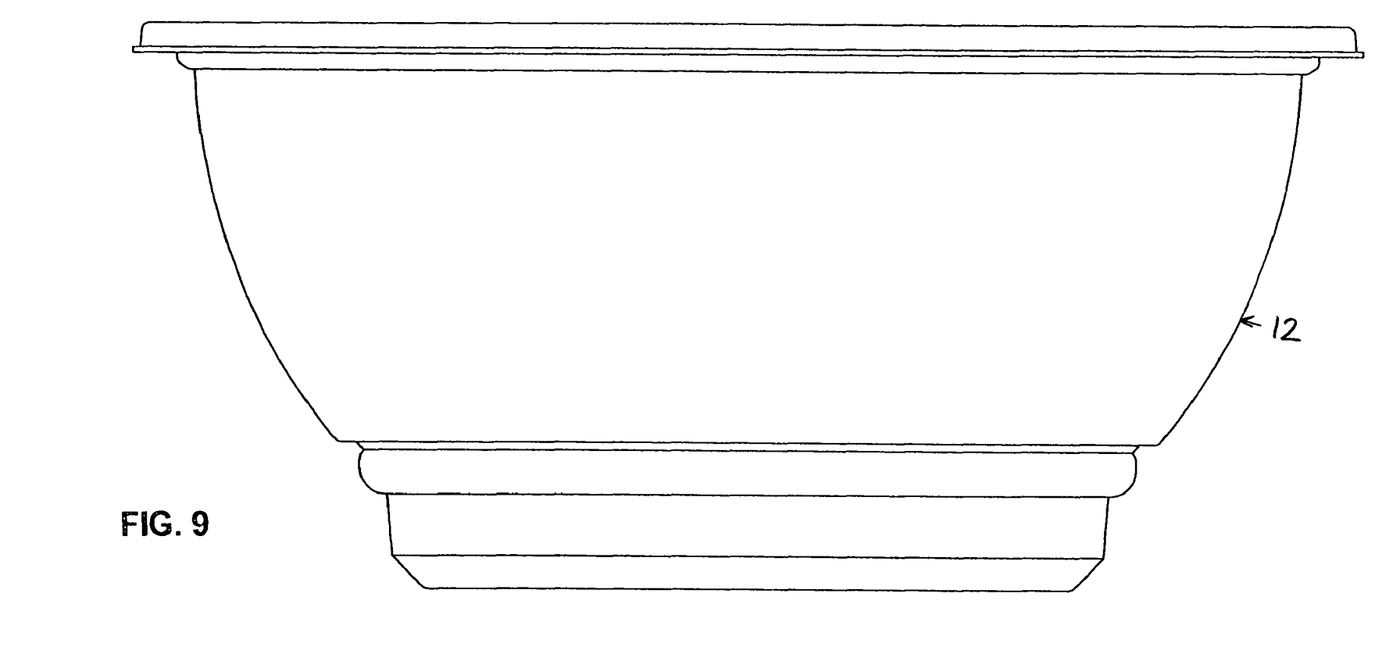
FIG. 9 is a side elevation view of the bowl of FIG. 1.
Figure 10:
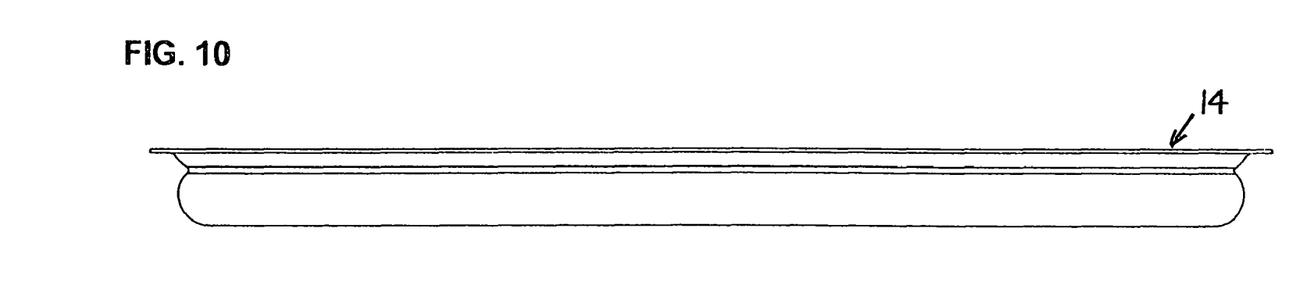
FIG. 10 is a side elevation view of only the platform of FIG. 1.

FIG. 6 shows that the bowl forms a sealing bowl ring in the form of a groove 52 that faces in a direction 54 that is partially radially inward Ri (towards the axis) and at an upward incline from the horizontal. The platform peripheral portion 22 has a convex radially outward Ro sealing platform ring in the form of a protrusion 56 that fits in the bowl groove 52 and seals to it. As a result, if the bowl contains considerable fluid, the fluid will not spill out if the bowl is tilted. In stores, bowls which contain hot food such as hot chicken parts, are sometimes displayed in a tilted orientation, and the bowls are sometimes tilted when they are carried, the seal preventing fluid leakage in those situations. The bowl groove 52 and platform protrusion 56 preferably extend 360° around the axis; i.e. there is no gap. It is possible to instead form the bowl ring as a protrusion and the platform ring as a groove. The bowl groove is concave and is shown as rounded although a concave groove can be of a variety of cross-sections such as v-shaped, rectangular shaped, etc. Similarly, the convex protrusion 56 can have a variety of shapes.

The bowl has a bottom wall 60 With a middle that is deformed upward to provide a center support 62 that supports the platform walls at the center of the recess 42 in the top of the platform. In addition, the bowl bottom wall 60 is deformed upward to form a barrier or deflector 64 that divides the lower chamber 34 into a center or middle chamber portion 70 that lies immediately around the center support 62, and an outer chamber portion 72 that lies around the deflector. Applicant prefers that most of the fluid that is to be stored in the lower chamber, be stored in the outer chamber portion 72. As a result, if the bowl assembly is moved or tilted, most of the fluid will be confined to the outer chamber portion and a minimum can quickly reach the middle chamber portion 72 and the holes 50.

Figures 3, 4:
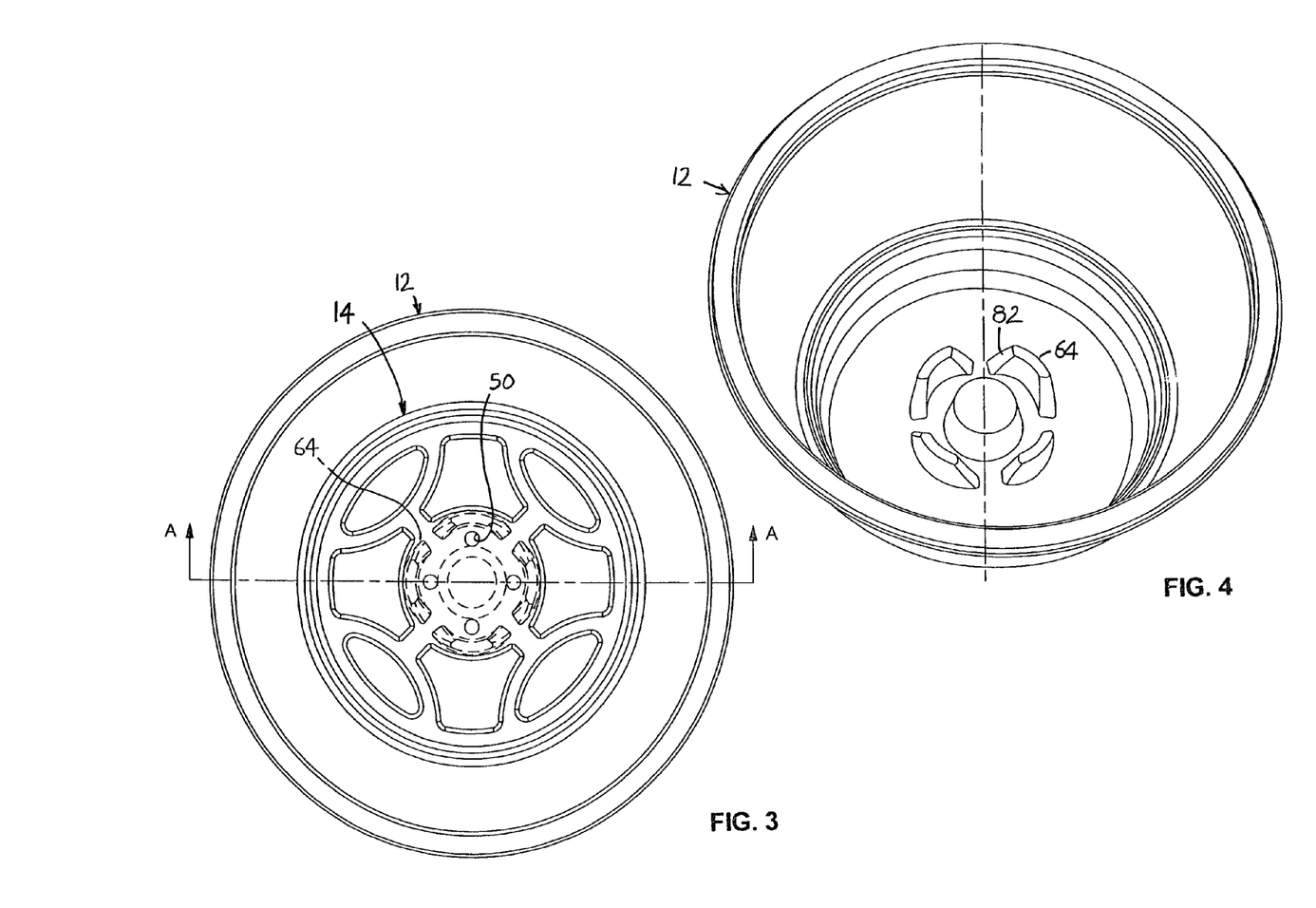
FIG. 3 is a plan view of the bowl assembly of FIG. 2.
FIG. 4 is a top isometric view of just the bowl of the bowl assembly of FIG. 1.
Figures 11, 12:
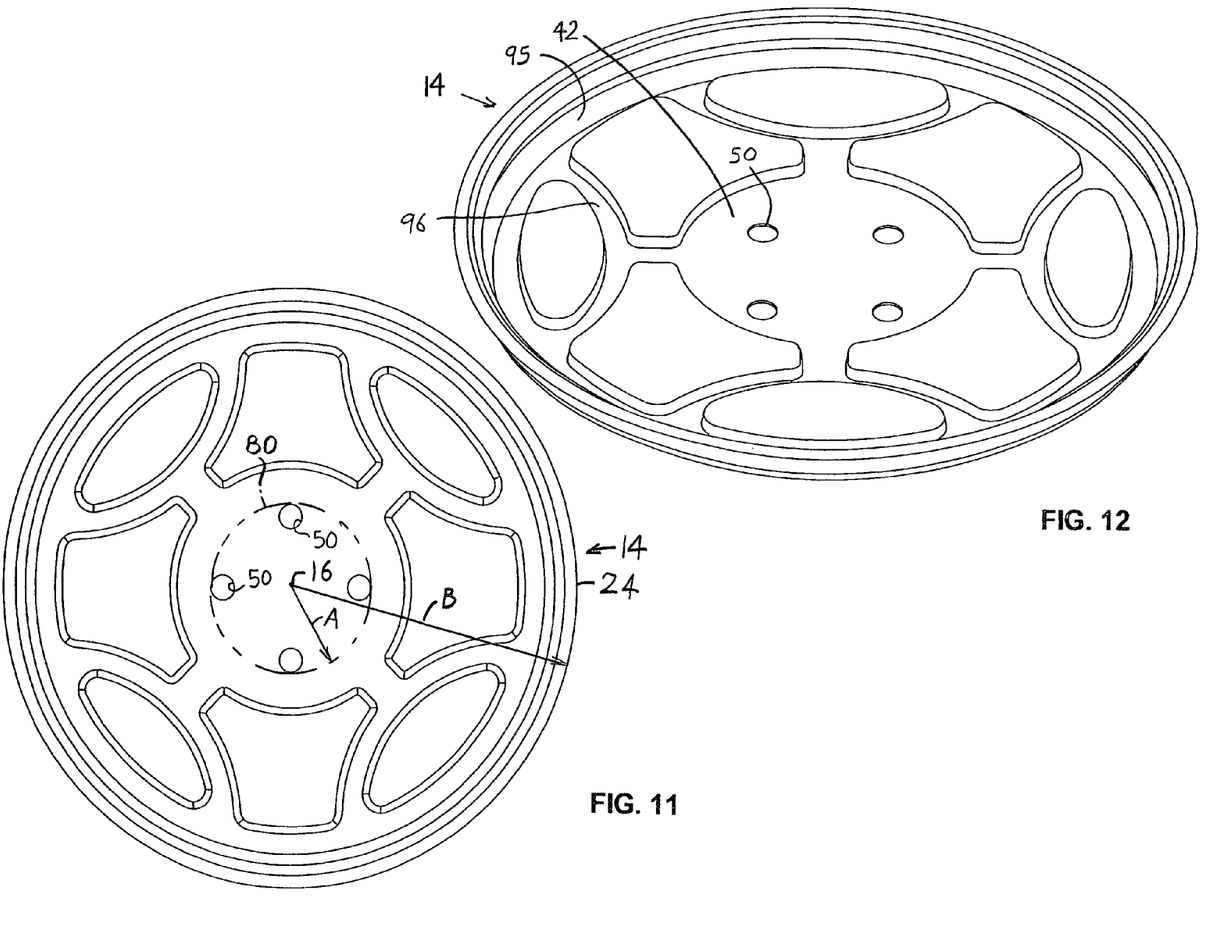
FIG. 11 is a plan view of only the platform of FIG. 1.
FIG. 12 is a top isometric view of only the platform of FIG. 11.

As shown in FIG. 11 the holes 50 comprise four holes that lie within a circle 80 of limited radius A. The radius A is less than half, and preferably less than one-third the radius B of the platform from the axis 16 to its rim 24. This causes fluid to flow down to the center portion of the lower chamber, with most of the fluid then flowing to the outer portion of the lower chamber. FIG. 3 shows that the holes 50 lie within the deflector 64. FIG. 4 shows that the deflector has gaps 82 that allow fluid to flow between the lower chamber portions, but the gaps occupy a minority of the deflector wall area. FIG. 5 shows that the outside radius C of the bowl lower chamber outer portion 72 is at least twice the radius D of the bowl lower chamber inner portion 70, so in a quiescent condition less than one-fourth the volume of liquid will be stored in the inner chamber portion. Because the center support 62 that takes up about half the volume within the deflector, the bowl lower chamber inner portion 70 actually stores less than one-fifth of the volume of liquid in the lower chamber.

FIG. 6 shows that the rim 24 of the platform is slightly spaced from the adjacent bowl inner wall 84. A person who wants to reuse the bowl assembly can insert an object against the edge of the rim to curl it up and then grasp the rim to pull the platform up out of the bowl. Applicant has constructed a bowl assembly of the construction shown in FIGS. 1-12, with the bowl having a wall thickness of 1.2 millimeter (0.047 inch) and the platform having a wall thickness of 0.5 mm (0.020 inch). The platform was formed of PETE (polyethylene terephthalate ethylene). The bowl groove top at 90 (FIG. 6) protrudes radially inward from the bowl groove outermost location 92, so the groove can be said to be vertically undercut. The vertical undercut length G is 0.4 mm so only a small deflection of the platform is required for removal. As a result the platform outward protrusion outer location 94 cannot move upward past the groove wall top 90 without deforming the platform or groove (the platform deforms). This retains the platform in the bowl. FIG. 12 shows that recess 95 resulting from the protrusion, is connected through recess 96 to the central recess 42 that leads to the drain holes 50.

The bowl and platform can be constructed from a variety of polymers including Oriented Polystyrene (OPS), Talc-Filled Polypropylene (TFPP), High Impact Polystyrene (HIPS), Polypropylene (PP), Polyethylene Terepthalate (PET), Amorphous PET (APET), Crystallized Polyethylene (CPET), Polyacid (PLA), Polystyrene, Styrene Block Copolymer, Polyvinyl Chloride (PVC), and Methacrylate Blends, and a variety of other materials.

Figures 13, 14:
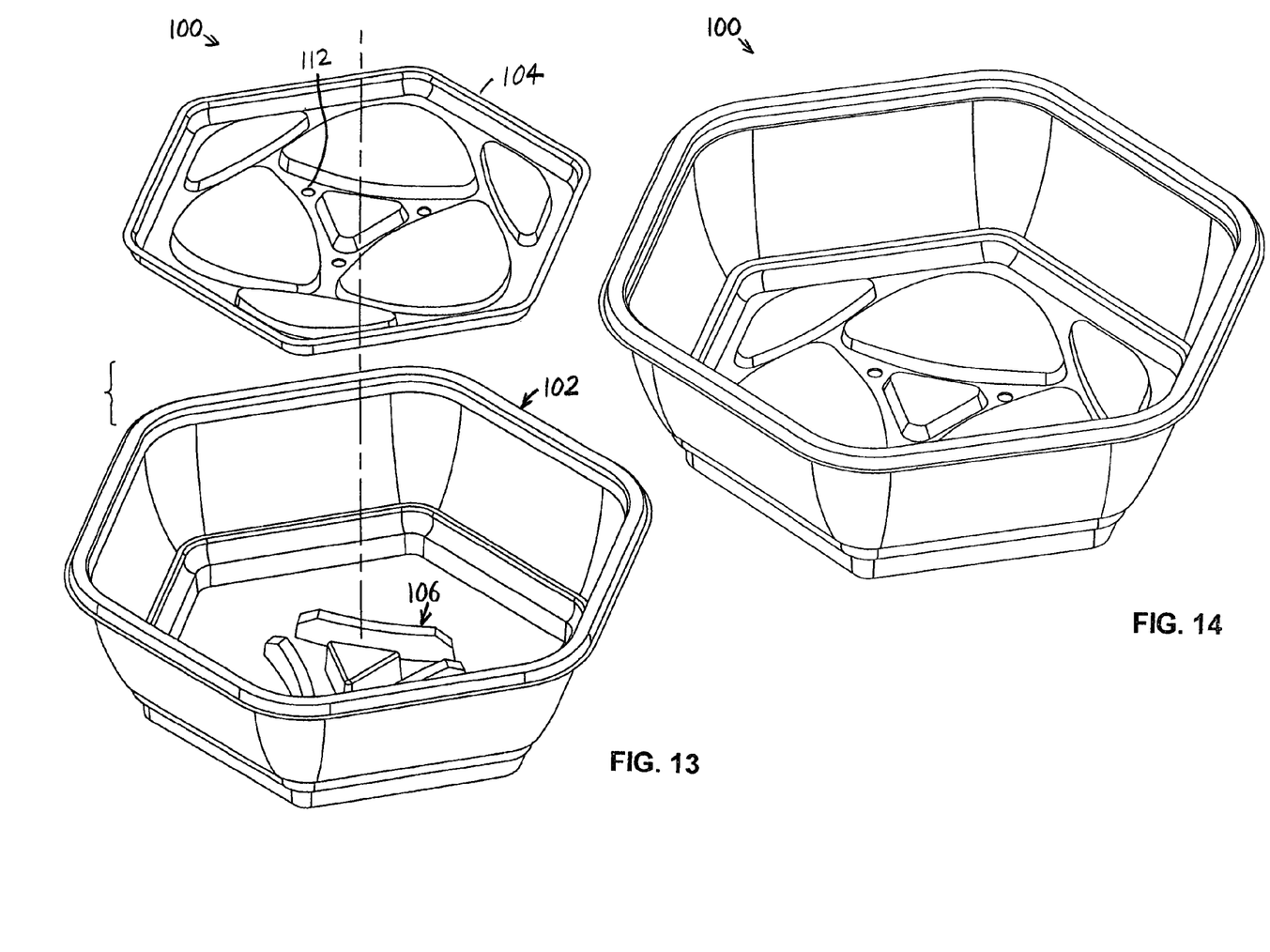
FIG. 13 is a top exploded isometric view of a bowl assembly of another embodiment of the invention wherein the outside of the bowl is of hexagonal shape.
FIG. 14 is a top isometric view of the bowl assembly of FIG. 13 in a fully assembled configuration.
Figures 15, 16:
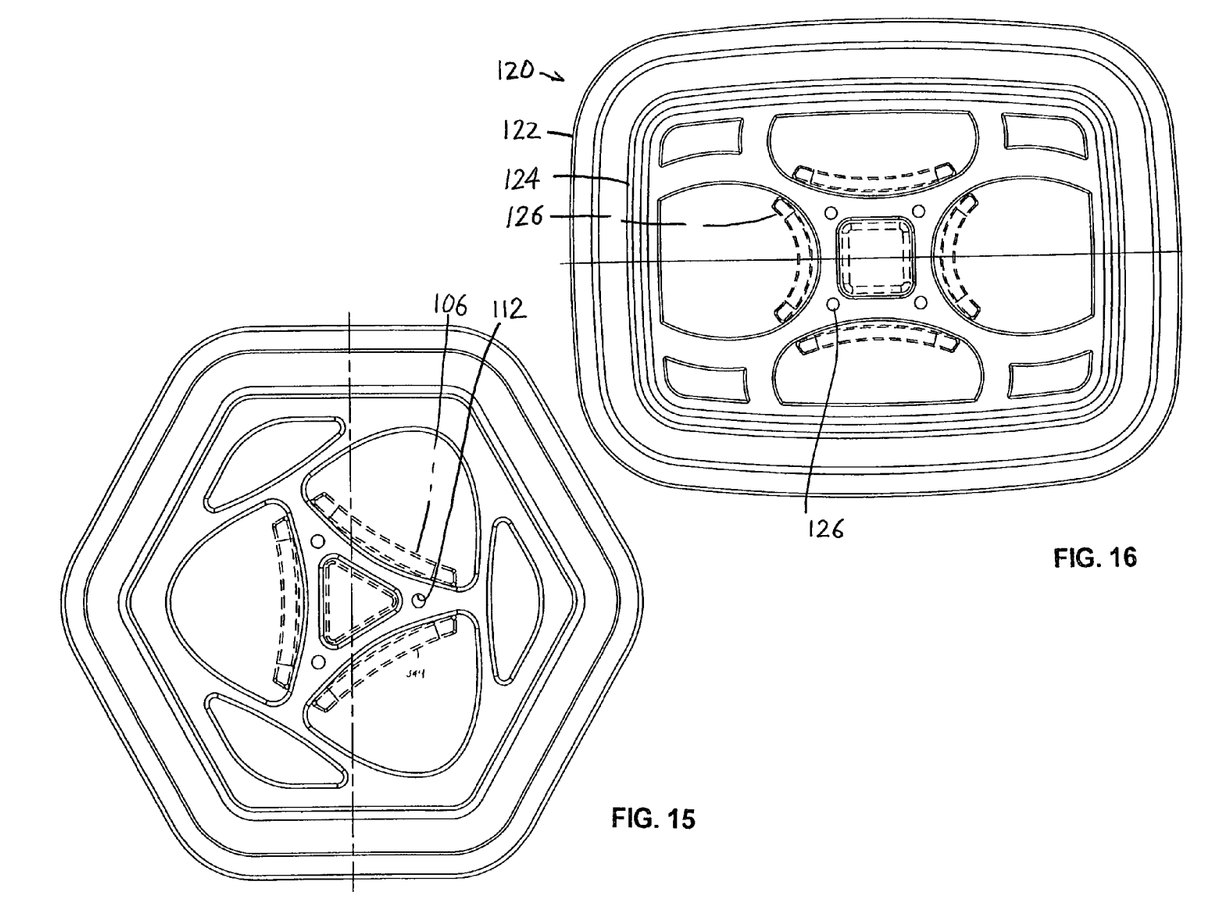
FIG. 15 is a plan view of the bowl assembly of FIG. 14.
FIG. 16 is a plan view of a bowl assembly of another embodiment of the invention wherein the outside of the bowl is of largely rectangular shape.

FIGS. 13-15 show another bowl assembly 100 with an exterior in the shape of a regular hexagon (except for rounded corners) in both the bowl 102 and platform 104. A deflector 106 formed of three deflector sections encompasses the outermost parts of drain holes 112, as best seen in FIG. 15.

FIG. 16 shows another bowl assembly 120 with an exterior in the shape of a rectangle (except for rounded corners and slightly curved sides) in both the bowl 122 and platform 124. A deflector 126 formed of four deflector sections encompasses the outermost parts of drain holes 126.

Figure 17:
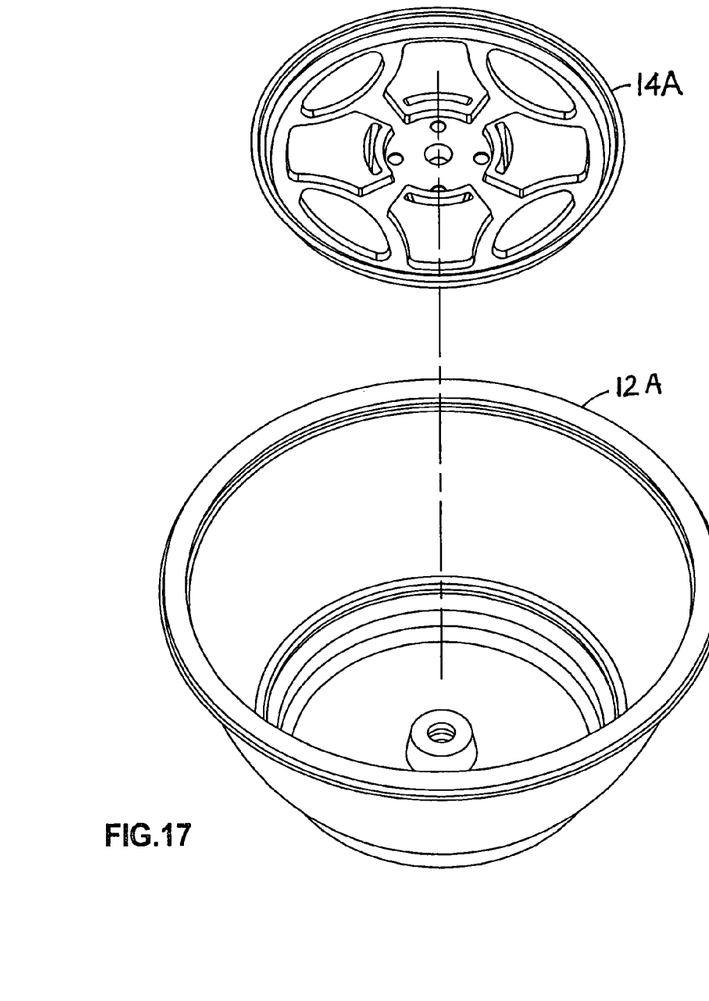
FIG. 17 is a exploded isometric view of a bowl assembly of another embodiment of the invention wherein the deflector is formed in the platform.
Figure 18:
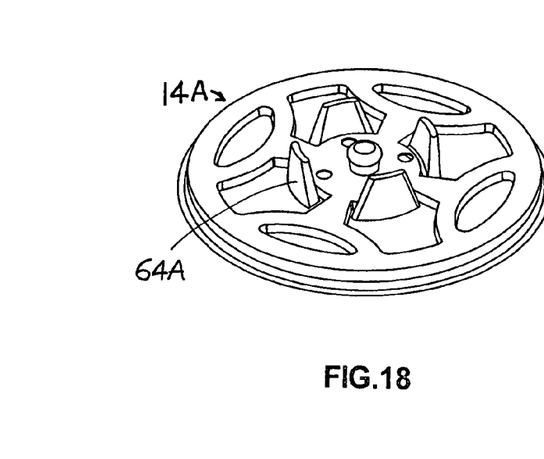
FIG. 18 is an isometric view of the platform of FIG. 17 in an upside-down position.
Figure 19:
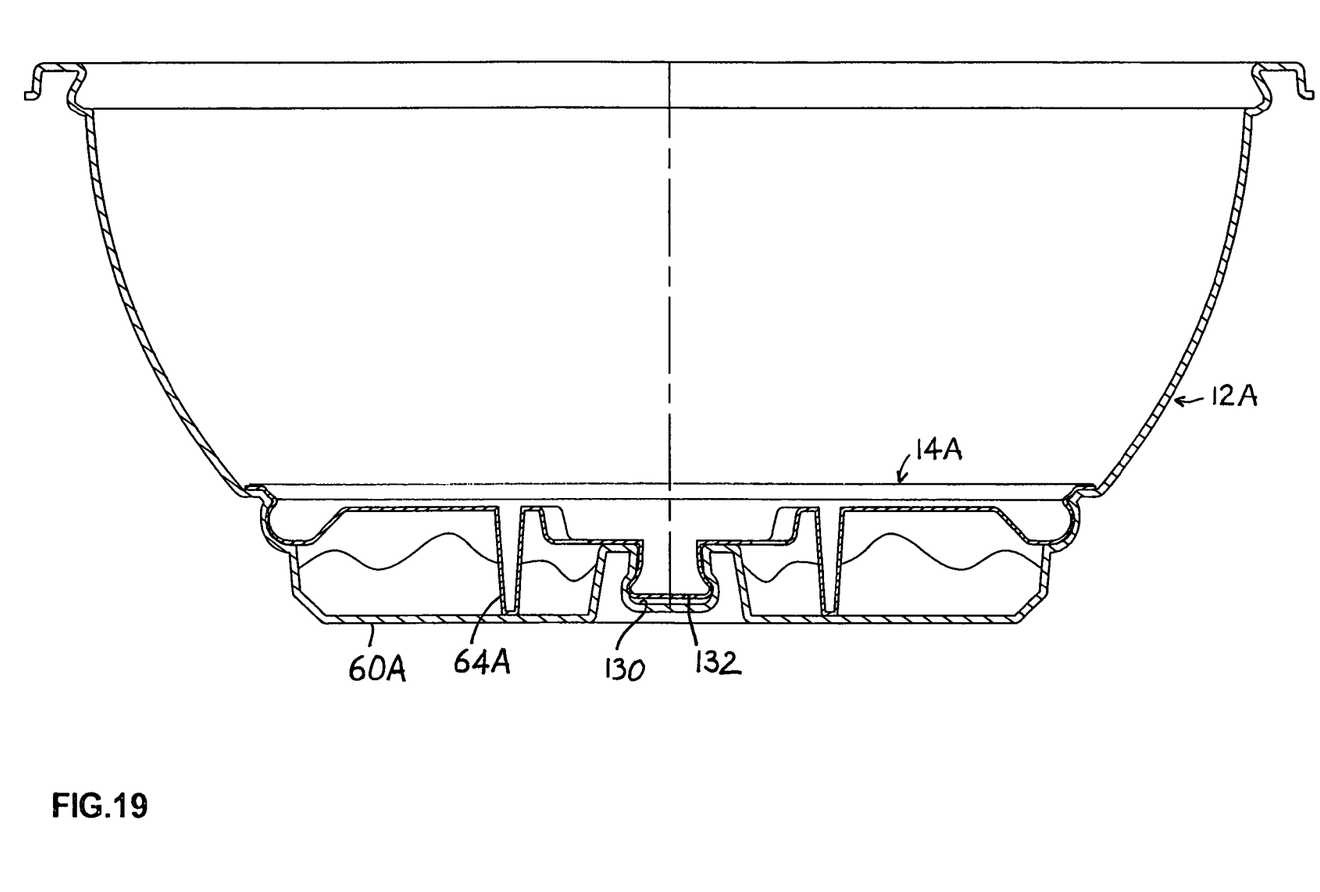
FIG. 19 is a sectional view of the fully assembled bowl of FIG. 17.

FIGS. 17-19 show another bowl assembly that is similar to that of FIGS. 1-2 except that it includes a deflector 64A formed as part of the platform 14A instead of part of the bowl 12A. In FIG. 19, the bowl bottom wall 60A forms a recess 130 that receives a downward projection 132 in the platform. The projection 132 is undercut to resist lift up.

Thus, the invention provides a bowl assembly which can contain food and unwanted (by the food eater) fluids, which avoids spilling the fluid and which can be constructed at low cost. The bowl assembly includes a platform with a platform periphery that rests on a shoulder of the bowl and with a platform center that rests on a center support formed in the bottom of the bowl. The platform has support surfaces that support food to be eaten and has recesses that receive fluid to be drained. The platform also has drain holes in the recesses that lie close to the bowl assembly axis. The bottom wall of the bowl or the platform forms a deflector, with the drain holes lying closer to the axis than adjacent portions of the deflector. The deflector has gaps that allow fluid to flow radially inward and outward, while avoiding sloshing. The bowl side wall forms a vertically undercut groove, and the platform has a radially outward protrusion that lies in the groove and makes contact with the groove walls, to seal the periphery of a lower compartment that lies under the platform.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A food bowl assembly which includes a bowl with a central vertical axis, the bowl having a bowl bottom, a bowl top, and bowl side walls, and a food platform for supporting food and for separating the bowl internal volume into upper and lower compartments lying respectively above and below the platform, said platform having a periphery, and wherein:
   said platform has support surfaces and has recess areas that lie below said support surfaces, and said platform has drain holes in said recess areas through which fluids can flow to said lower compartment, said platform having a rim that rests on an inner surface of the bowl side walls between said bowl bottom and said bowl top;
   all of said drain holes lie closer to said axis than to said platform periphery.

2. The bowl assembly described in claim 1 wherein:
   said drain holes are spaced from said axis by no more than one-third the radius of said platform periphery.

3. The bowl assembly described in claim 1 wherein:
   said bowl assembly forms a deflector that is centered on said axis, said deflector having portions that extend further from said axis than adjacent ones of said drain holes, said deflector dividing said lower compartment into central and outer regions, said deflector having a plurality of radial gaps, through which fluids can flow between said central and outer regions.

4. The bowl assembly described in claim 1 wherein said bowl side walls form an upwardly-facing bowl shoulder on which said platform rests, said bowl shoulder extending 360° continuously about said axis, and said platform has a downwardly-facing platform shoulder extending 360° continuously about said axis and that rests on said bowl shoulder.

5. The bowl assembly described in claim 1 wherein:
said bowl forms a lower concave bowl groove that faces primarily radially inward;
said platform has a convex platform protrusion that fits into said lower concave bowl groove to seal the periphery of the platform to the bowl and resist platform removal.

6. The bowl assembly described in claim 5 wherein:
said bowl groove is vertically undercut, to resist lift-up of said convex lower platform shoulder.

7. A food bowl assembly comprising a bowl which has a vertical axis, a bowl open top, a bowl closed bottom, and bowl side walls, said bowl assembly including a platform with a rim, wherein:
said bowl side walls form a bowl ring on the inside of the bowl, the bowl ring lying closer to said bowl bottom than said bowl top, and said platform forms a platform ring that fits tightly to said bowl ring to form a seal thereagainst;
of said bowl ring and platform ring, said bowl ring is concave relative to an inside of the bowl and said platform ring is convex relative to the inside of the bowl, with the convex ring fitting into the concave ring and forming a 360° seal.

8. The bowl assembly described in claim 7 wherein:
said bowl ring is a groove that is vertically undercut to resist lift-up of said platform.

9. The bowl assembly described in claim 7, wherein:
said bowl has a lower bowl region that lies below said platform;
said platform has an upper surface and forms a plurality of recesses that lie below said upper surface and that merge, including a central recess which has through holes and including a platform convex protrusion having a bottom, so fluid can flow along said recesses and fall down through said holes into said bowl lower region;
all of said holes lie spaced from said axis by less than half the diameter of said platform rim.

10. The bowl assembly described in claim 9 wherein:
said bowl closed bottom has an upstanding deflector that extends around said axis and lies at least as far from said axis as adjacent ones of said drain holes, but with said deflector having gaps.

11. The bowl assembly described in claim 9 wherein:
said platform convex protrusion forms one of said recesses that is connected by another of said recesses to said central recess.

12. A food bowl assembly comprising a bowl with a vertical axis, a bowl top, a bowl closed bottom, and bowl side walls forming an upward-facing bowl shoulder at a height above said bowl bottom, said bowl assembly including a platform with a support wall for supporting food and with a rim that lies adjacent to said upward-facing bowl shoulder, said platform forming a lower compartment below the platform, wherein:
said platform has a plurality of connected recesses and a plurality of holes in said recesses for draining fluids into said lower compartment;
at least one of said bowl and platform forming a deflector dividing said lower compartment into an inner portion and an outer portion, the deflector slowing the flow of fluid from the outer portion to the inner portion when the bowl assembly is moved.

13. The bowl assembly in claim 12 wherein:
said deflector has an average radius that is less than half the radius of said platform rim.

14. The bowl assembly in claim 12, wherein:
said bowl side walls form an internal groove below said upward-facing bowl shoulder with said groove being vertically undercut;
said platform forms a radially outward protrusion that lies in said groove and forms a rim above said protrusion that lies adjacent to said upward-facing bowl shoulder.

15. The bowl assembly described in claim 12 wherein:
said lower compartment has a plurality of connected regions, a first of said regions is at a middle of the lower compartment around said axis, and a larger second of said regions extends around said first region, with said plurality of holes connecting to said first region.

16. A food bowl assembly which includes a bowl with a central vertical axis, the bowl having a bowl bottom and bowl side walls, and a food platform with a support surface for supporting food and for separating the bowl internal volume into upper and lower compartments lying respectively above and below the platform, said platform having a periphery, and wherein:
at least one of said platform and bowl forms deflector walls separating said lower compartment into a plurality of connected regions; and
means for draining fluid from said support surface directly into at least one selected region, wherein
said bowl forms a lower concave bowl groove that faces primarily radially inward;
said platform has a convex platform protrusion that fits into said lower concave bowl groove to seal the periphery of the platform to the bowl and resist platform removal;
said bowl groove being vertically undercut, to resist lift-up of said convex lower platform shoulder.

* * * * *